United States Patent
Chiu

(10) Patent No.: US 6,755,423 B2
(45) Date of Patent: Jun. 29, 2004

(54) TOOL COUPLING DEVICE FOR CHANGEABLE TOOL MEMBERS

(76) Inventor: Li Jiun Chiu, P.O. Box 65-45, Taichung (TW), 403

( * ) Notice: Subject to any disclaimer, the term of this patent is extended or adjusted under 35 U.S.C. 154(b) by 0 days.

(21) Appl. No.: 10/199,532

(22) Filed: Jul. 17, 2002

(65) Prior Publication Data

US 2004/0012161 A1 Jan. 22, 2004

(51) Int. Cl.⁷ .......................................... B23B 31/107
(52) U.S. Cl. ............................ 279/30; 279/22; 279/75; 279/905
(58) Field of Search ...................... 279/22, 30, 74–75, 279/904, 905, 143–145; 81/438, 439

(56) References Cited

U.S. PATENT DOCUMENTS

| | | | | |
|---|---|---|---|---|
| 2,736,562 A | * | 2/1956 | Blackburn | 279/76 |
| 3,583,716 A | * | 6/1971 | Daniel, Jr. | 279/81 |
| 4,692,073 A | * | 9/1987 | Matindell | 279/75 |
| 5,013,194 A | * | 5/1991 | Wienhold | 279/75 |
| 5,573,255 A | * | 11/1996 | Salpaka | 279/75 |
| 6,179,302 B1 | * | 1/2001 | Gauthier et al. | 279/75 |
| 6,260,281 B1 | * | 7/2001 | Okumura et al. | 279/75 |
| 6,270,085 B1 | * | 8/2001 | Chen et al. | |
| 6,543,959 B1 | * | 4/2003 | Jore | 279/75 |

* cited by examiner

*Primary Examiner*—Daniel W. Howell

(57) ABSTRACT

A tool coupling device includes a stem having a front channel for receiving ends of tool members, and having a lateral orifice communicating with the channel of the stem for receiving a ball. The tool members each has an aperture formed in one end for receiving the ball. A barrel is rotatably engaged onto the stem, and has a peripheral bulge for selectively forcing the ball into the aperture of the tool member. A spring may bias the peripheral bulge of the barrel to engage with the ball, and to force the ball into the aperture of the tool member and to lock the tool member to the stem.

2 Claims, 6 Drawing Sheets

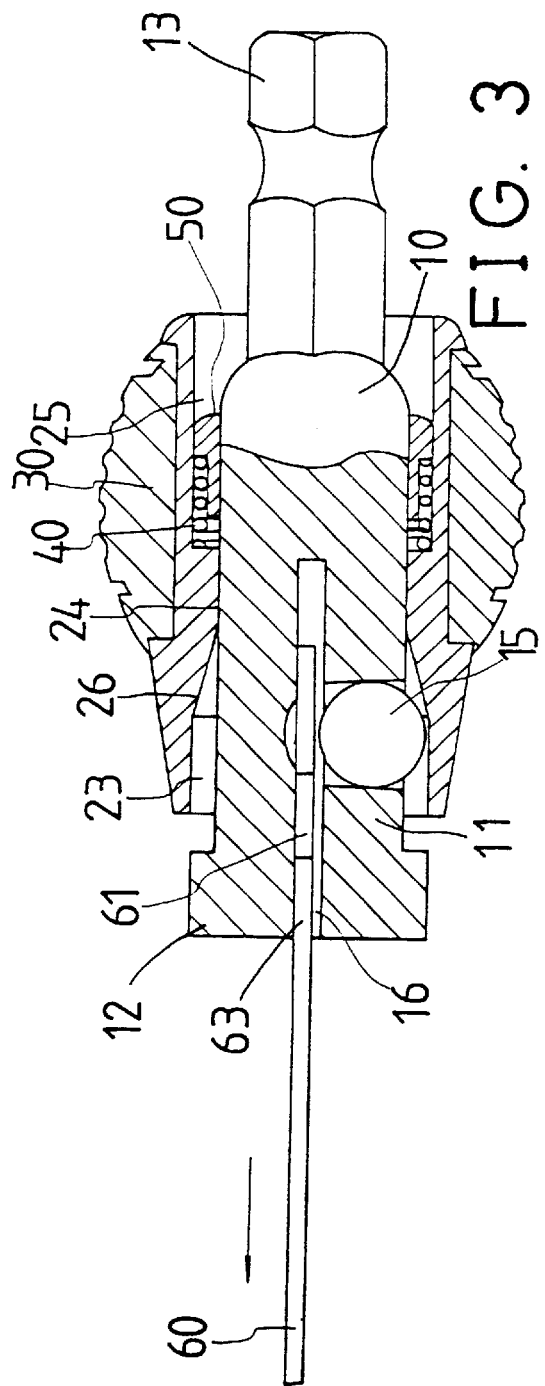
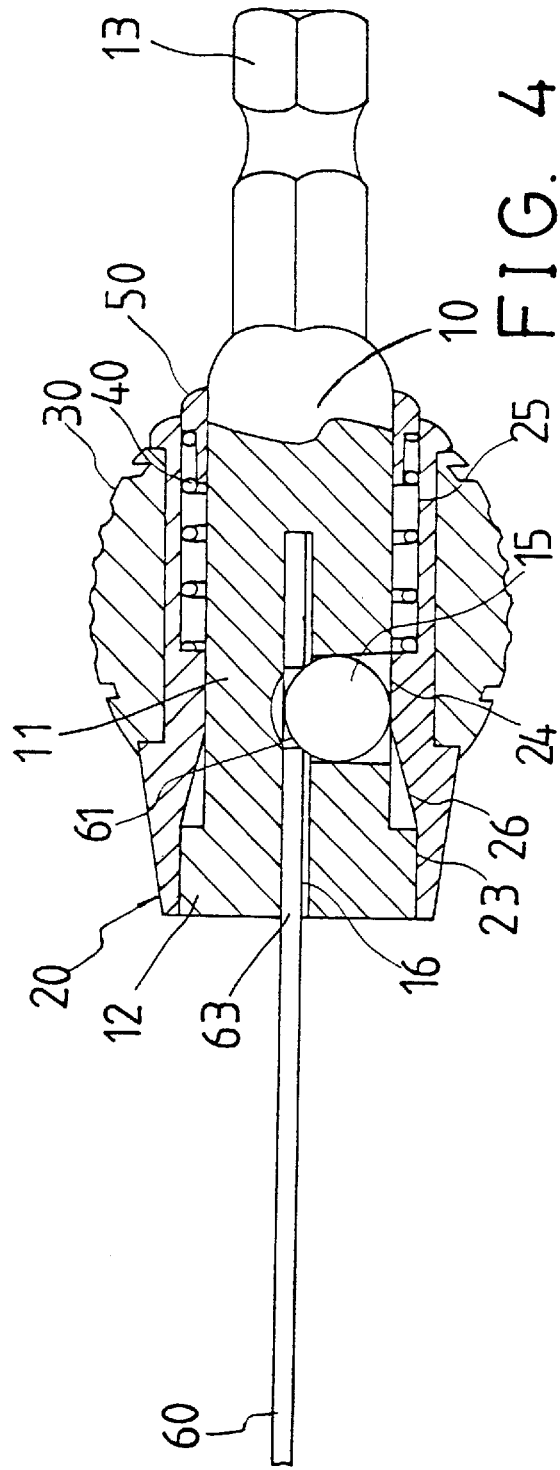

TOOL COUPLING DEVICE FOR CHANGEABLE TOOL MEMBERS

BACKGROUND OF THE INVENTION

1. Field of the Invention

The present invention relates to a tool coupling device, and more particularly to a tool coupling device for changeably coupling tool members to power tools or handles.

2. Description of the Prior Art

Typical tool assemblies may include various kinds of tool bits or tool members that may be changed with each other for driving different or various kinds of fasteners, and/or for conducting various workings. However, the tool members may not be solidly secured in place, and may not be changeably secured to the typical tool devices.

The present invention has arisen to mitigate and/or obviate the afore-described disadvantages of the conventional tool devices.

SUMMARY OF THE INVENTION

The primary objective of the present invention is to provide a tool coupling device including one or more tool members that may be changed with each other.

The other objective of the present invention is to provide a tool coupling device including one or more tool members that may be solidly secured to the tool handle or to the power tool.

In accordance with one aspect of the invention, there is provided a tool coupling device comprising a stem including a front portion having a channel formed therein, and having an orifice laterally formed therein and communicating with the channel of the stem, at least one tool member including a first end for selectively engaging into the channel of the stem, and including an aperture formed in the first end thereof, a ball slidably received in the aperture of the stem and engageable into the aperture of the tool member, for detachably securing the tool member to the stem, a barrel including a bore formed therein for rotatably receiving the stem, and including a peripheral bulge extended radially and inwardly into the bore of the barrel for selectively engaging with the ball, and for selectively forcing the ball into the aperture of the tool member, and thus for detachably securing the tool member to the stem. A spring biasing means may further be provided for biasing the peripheral bulge of the barrel to engage with the ball, and to force the ball into the aperture of the tool member. The tool member may thus be easily and quickly and detachably secured to the stem by the ball and the barrel, by moving the barrel relative to the stem against the spring biasing means, and by releasing the barrel.

The barrel includes a middle portion having the peripheral bulge extended radially and inwardly into the bore of the barrel for forming a front chamber and a rear chamber in the barrel. The peripheral bulge preferably includes an inner diameter slightly greater than the outer diameter of the stem for rotatably receiving the stem in the peripheral bulge of the barrel.

The barrel includes a ramp provided therein and inclined from the peripheral bulge toward the front chamber of the barrel.

The stem includes an enlarged head provided on the front portion thereof and slidably received in the front chamber of the barrel, for engaging with the barrel, and for limiting the movement of the barrel relative to the stem.

The biasing means includes a spring engaged between the barrel and the stem for biasing the barrel relative to the stem and for biasing the peripheral bulge of the barrel to engage with the ball.

The stem includes a collar provided thereon, the spring is preferably engaged between the collar of the stem and the peripheral bulge of the barrel, for biasing the peripheral bulge of the barrel to force the ball into the aperture of the tool member.

The barrel includes an outer peripheral portion having an outer peripheral recess formed therein, and a ferrule may be solidly secured to the barrel, or may be rotatably engaged onto the outer peripheral recess of the barrel for moving the barrel relative to the stem, and for disengaging the peripheral bulge of the barrel from the ball, and thus for allowing the end portions of the tool members to be engaged into the channel of the stem.

Further objectives and advantages of the present invention will become apparent from a careful reading of a detailed description provided hereinbelow, with appropriate reference to accompanying drawings.

BRIEF DESCRIPTION OF THE DRAWINGS

FIG. 3 is a partial cross sectional view taken along lines 3—3 of FIG. 2;

FIGS. 4, 5 are partial cross sectional views similar to FIG. 3, illustrating the operation of the tool coupling device;

DETAILED DESCRIPTION OF THE PREFERRED EMBODIMENT

Figure 1:
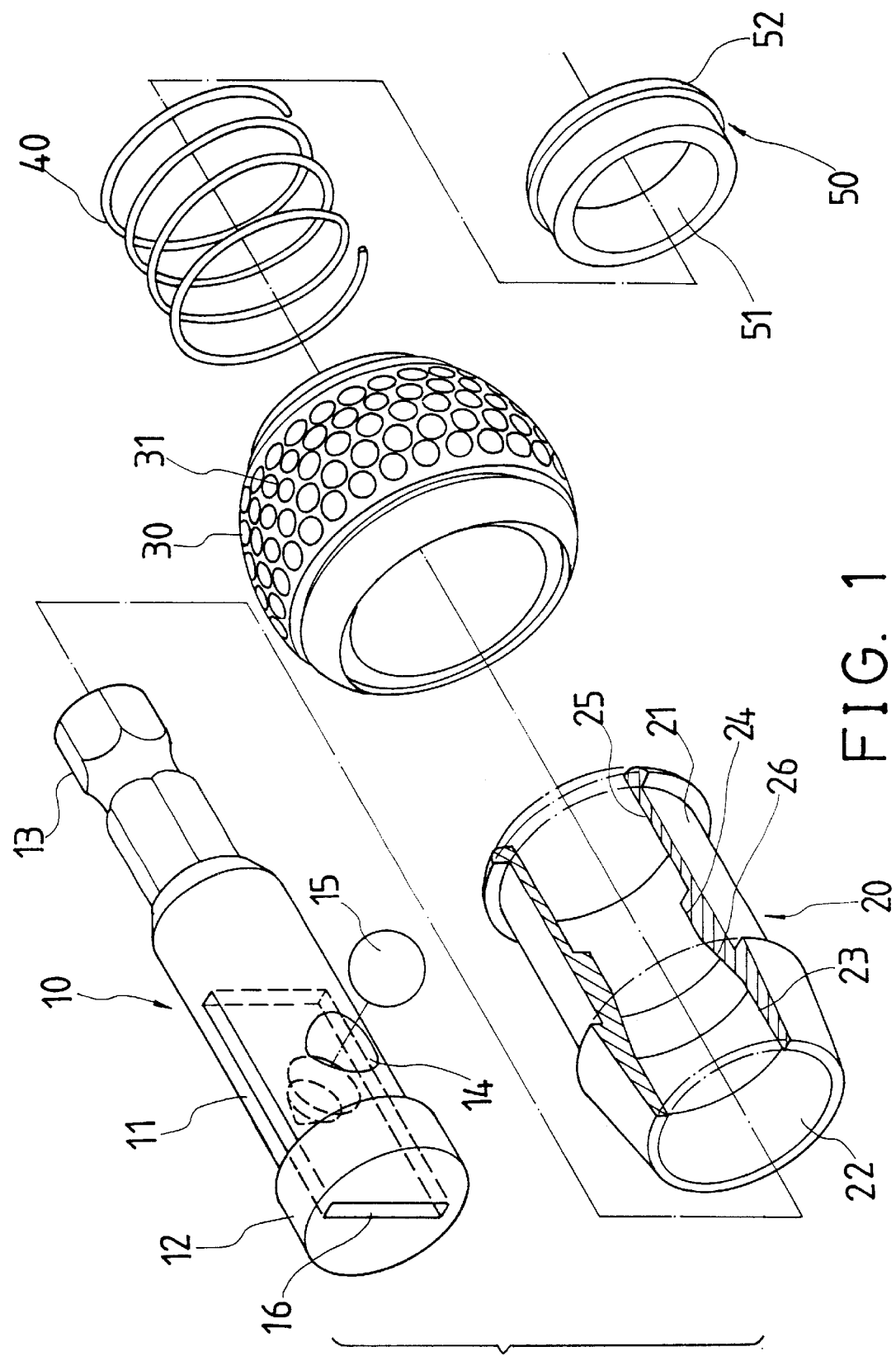
FIG. 1 is an exploded view of a tool coupling device in accordance with the present invention.
Figure 2:
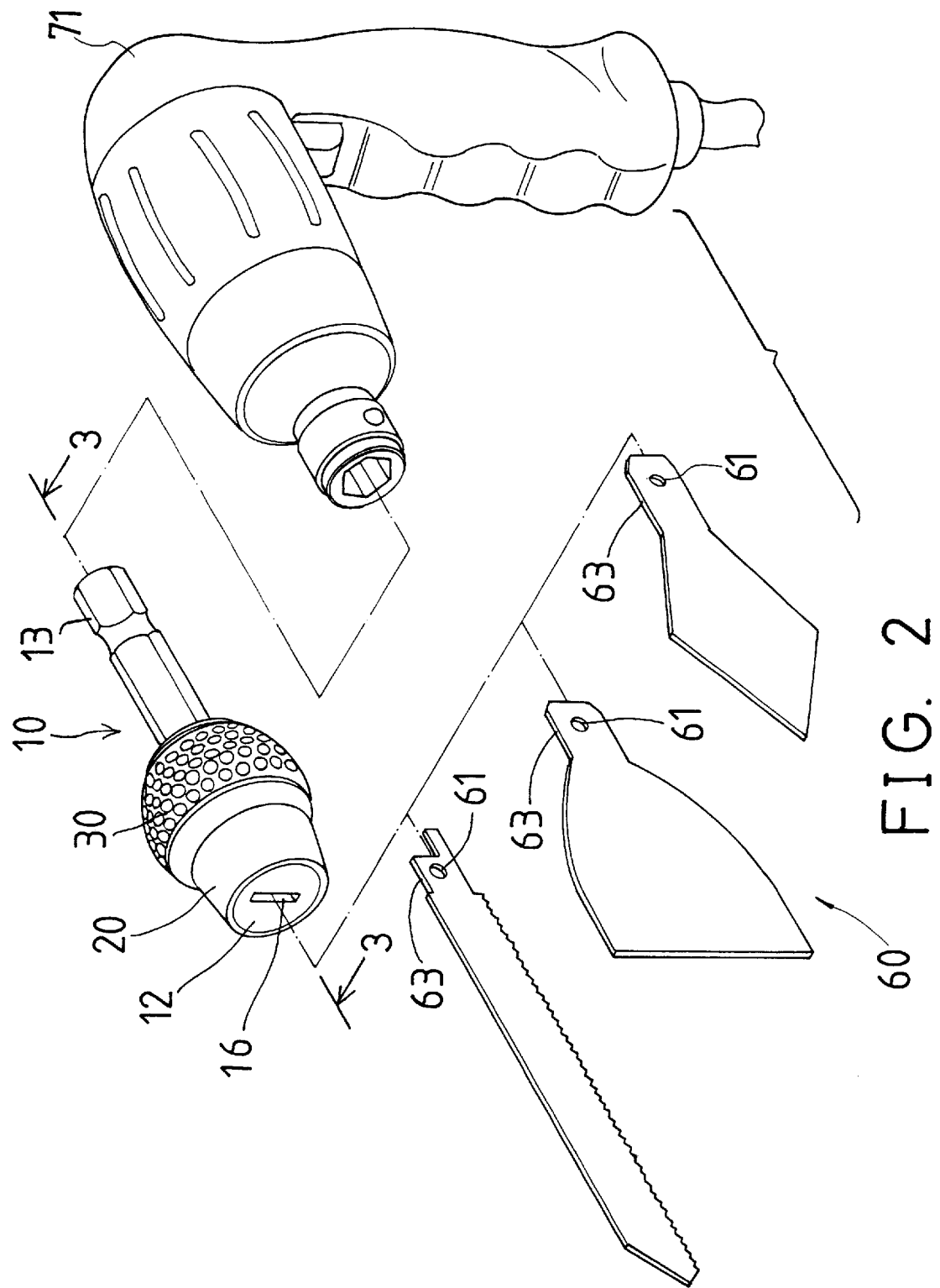
FIG. 2 is a partial exploded view illustrating the operation of the tool coupling device.

Referring to the drawings, and initially to FIGS. 1–3, a tool coupling device in accordance with the present invention comprises a stem 10 having a shank 13 extended rearwardly therefrom for engaging with or for coupling to power tools 71 (FIG. 2), or for coupling to handles 81, 91 (FIGS. 7, 8), and for allowing the stem 10 to be rotated or driven by the power tools 71 or by the users.

Figure 6:
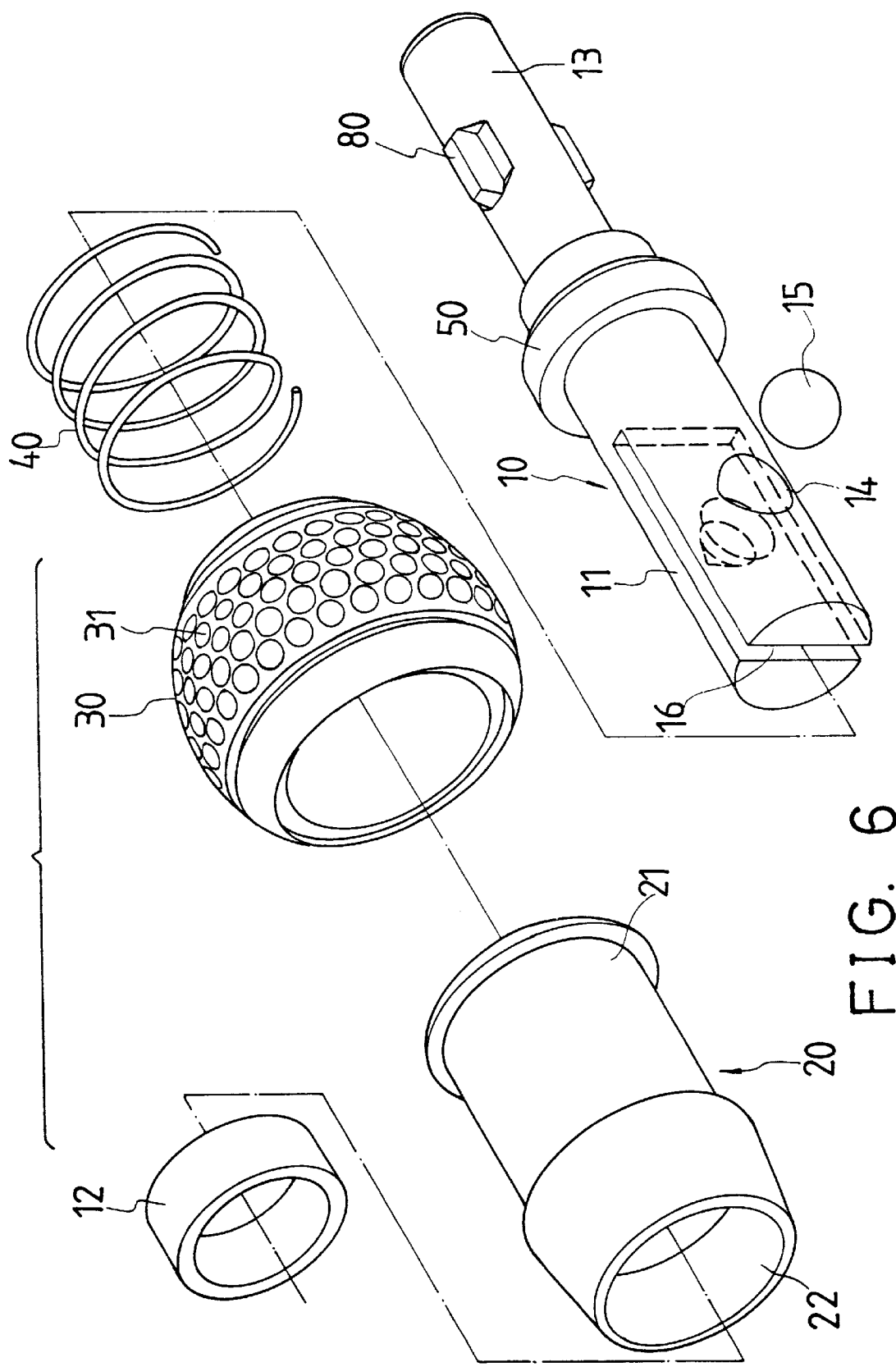
FIG. 6 is an exploded view similar to FIG. 1, illustrating another embodiment of the tool coupling device.
Figure 7:
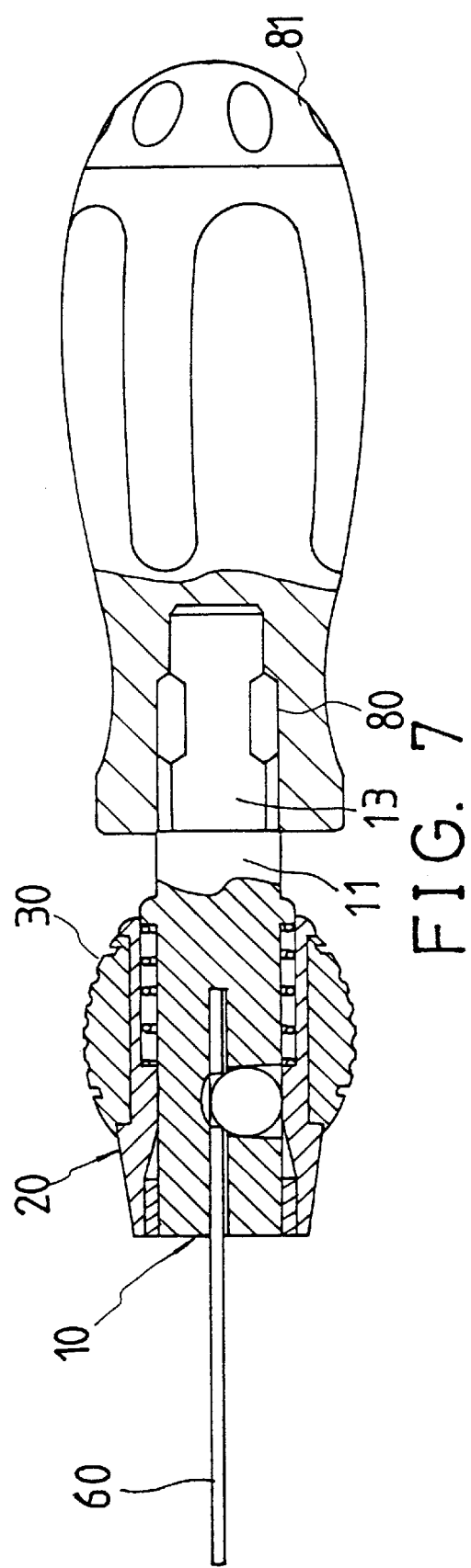
FIG. 7 is a partial cross sectional view similar to FIGS. 3–5, illustrating a further embodiment of the tool coupling device.
Figure 8:
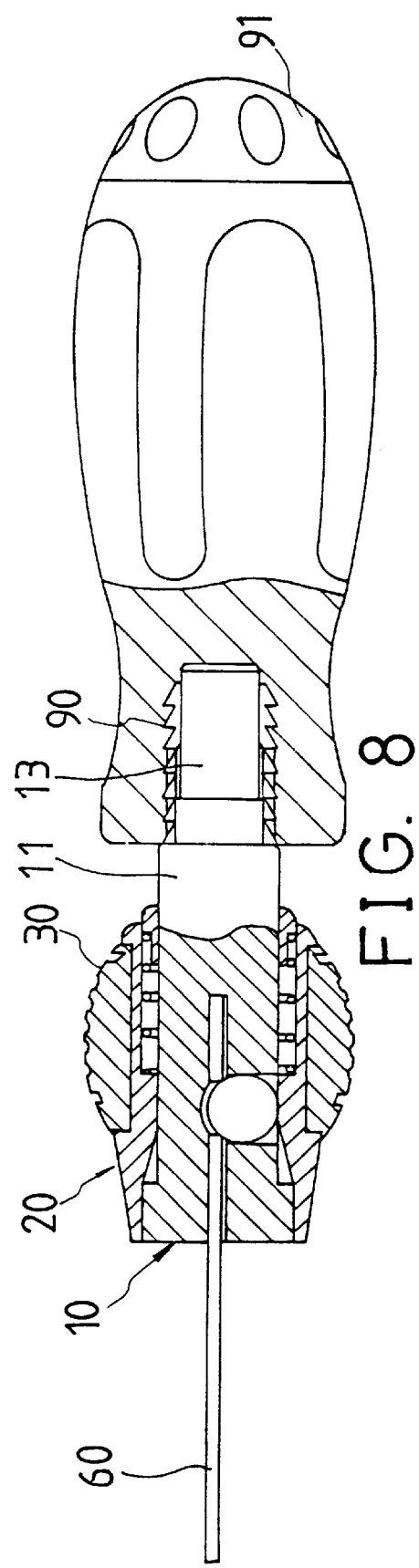
FIG. 8 is a partial cross sectional view similar to FIGS. 3–5 and 7, illustrating a still further embodiment of the tool coupling device.

As shown in FIGS. 6 and 7, the shank 13 may include one or more nips 80 extended therefrom for solidly engaging with or securing to the handle 81. As shown in FIG. 8, the shank 13 may also include a number of ratchet teeth 80 provided or extended therefrom for solidly engaging with or securing to the handle 81.

The stem 10 includes a channel 16 formed therein, such as formed in the front portion thereof, and formed or defined between a pair of bars 11, for receiving one ends 63 of various kinds of tool members 60 (FIGS. 3–5), and for coupling the tool members 60 to the power tool 71 and/or to the handles 81, 91, and for allowing the tool members 60 to be rotated or driven by the power tools 71 or by the users via the tool coupling device.

The stem 10 includes an enlarged head 12 formed or provided on the front portion thereof, and having the channel 16 formed through the head 12; and includes a lateral orifice 14 formed therein, such as laterally formed through the bars 11 thereof, and communicating with the channel 16 thereof, for slidably receiving a ball 15 therein. Alternatively, as shown in FIGS. 6, 7, a ring 12 may be formed separately and engaged or secured onto the front end of the stem 10, in order to form the head 12.

The tool members 60 each includes an aperture 61 formed in the end 63 thereof, for selectively receiving the ball 15 (FIGS. 3–5, 7 and 8), and for detachably securing the ends 63 of the tool members 60 to the stem 10. The apertures 61 of the tool members 60 include a diameter, preferably smaller than the outer diameter of the ball 15, for allowing the ball 15 to have a portion partially engaged into the apertures 61 of the tool members 60.

A barrel 20 is rotatably engaged onto the stem 10, and includes a bore 22 formed therein for rotatably receiving the stem 10, and includes a peripheral bulge 24 extended radially and inwardly into the middle portion of the bore 22 thereof, for forming a front chamber 23 and a rear chamber 25 therein. The barrel 20 includes a peripheral ramp 26 inclined from the peripheral bulge 24 toward the front chamber 23 thereof.

The bore 22 of the barrel 20 includes an inner diameter slightly greater than the outer diameter of the ring or the head 12, for allowing the head 12 to be engaged into and disengaged from the bore 22 or the front chamber 23 of the barrel 20 (FIGS. 3, 4). The head 12 may engage with the ramp 26 which may thus prevent the head 12 from moving beyond the peripheral bulge 24 of the barrel 20.

Figure 5:
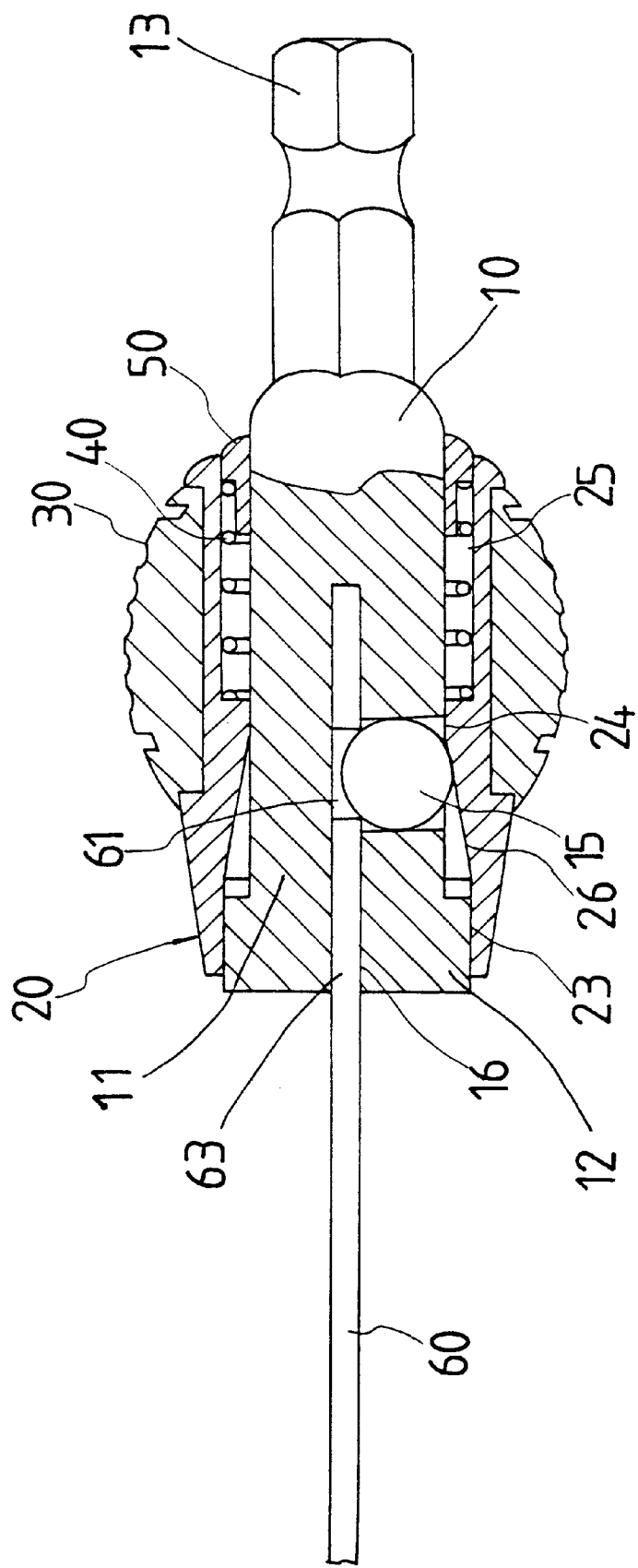

The peripheral bulge 24 of the barrel 20 includes an inner diameter slightly greater than the outer diameter of the stem 10, for allowing the stem 10 to be snugly engaged into or through the peripheral bulge 24 of the barrel 20 (FIGS. 3–5). The ramp 26 and/or the peripheral bulge 24 of the barrel 20 may engage with the ball 15, for forcing the ball 15 into the apertures 61 of the tool members 60, and thus for detachably securing the tool members 60 to the stem 10.

In operation, as shown in FIG. 3, when the ramp 26 and/or the peripheral bulge 24 of the barrel 20 is disengaged from the ball 15, or when the stem 10 is moved forwardly relative to the barrel 20, or when the head 12 or the front end of the stem 10 is moved outwardly of the barrel 20, the ball 15 may be received in the front chamber 23 of the barrel 20 and may be disengaged from the apertures 61 of the tool members 60, and thus for allowing the ends 63 of the tool members 60 to be engaged into and disengaged from the channel 16 of the stem 10.

As shown in FIGS. 4, 5, when the stem 10 is moved rearwardly relative to the barrel 20, or when the head 12 or the front end of the stem 10 is moved into the front chamber 23 of the barrel 20, or when the ramp 26 and/or the peripheral bulge 24 of the barrel 20 is engaged onto the ball 15, the ramp 26 and/or the peripheral bulge 24 of the barrel 20 may force the ball 15 to secure the tool members 60 to the stem 10.

The ramp 26 and/or the peripheral bulge 24 of the barrel 20 may thus form a forcing means for forcing the ball 15 to engage into the apertures 61 of the tool members 60, and thus for securing the tool members 60 to the stem 10.

A collar 50 may further be provided and may include a bore 51 formed therein for receiving the stem 10, and preferably includes a peripheral swelling 52 extended radially outwardly therefrom. The collar 50 may be secured onto the stem 10 with such as a force-fitted engagement, or by adhesive materials, or by welding processes, or with fasteners (not shown), or the like, and disposed or located distal to the head 12.

Alternatively, the stem 10 may include the collar 50 extended radially and outwardly therefrom, and may be formed as a one-integral piece with the stem 10, as shown in FIGS. 6 and 7.

A spring 40 is engaged onto the stem 10, and engaged between the collar 50 or the stem 10 and the peripheral bulge 24 of the barrel 20. The spring 40 may be formed as a biasing means for biasing the ramp 26 and/or the peripheral bulge 24 of the barrel 20 to be engaged with or engaged onto the ball 15, in order to force the ball 15 to secure the tool members 60 to the stem 10.

A ferrule 30 may further be provided and secured onto or rotatably engaged onto an outer peripheral recess 21 of the barrel 20, for moving the barrel 20 relative to the stem 10 against the spring 40; and preferably includes a knurled or a coarse outer peripheral surface 31 formed therein for facilitating the holding of the ferrule 30 and the movement of the ferrule 30 and the barrel 20 relative to the stem 10.

In operation, as shown in FIG. 3, the end portions 63 of the tool members 60 may be easily and quickly engaged into the channel 16 of the stem 10, when the ball 15 is disengaged from the ramp 26 and/or the peripheral bulge 24 of the barrel 20 and when the ball 15 is received in the front chamber 23 of the barrel 20, and when the barrel 20 is moved rearwardly relative to the stem 10 against the spring 40 by the ferrule 30.

The ramp 26 and/or the peripheral bulge 24 of the barrel 20 may then be engaged onto the ball 15, in order to force the ball 15 to secure the tool members 60 to the stem 10, when the ferrule 30 is released, or when the spring 40 bias the barrel 20 to move forwardly relative to the stem 10.

When the end portions 63 of the tool members 60 are required to be engaged into the channel 16 of the stem 10 again, it is only required to pull or to move the ferrule 30 and the barrel 20 rearwardly relative to the stem 10, and to disengage the ball 15 from the apertures 61 of the tool members 60. The tool members 60 of different thicknesses may all be secured to the stem 10 with the ball 15 and the barrel 20.

Accordingly, the tool coupling device in accordance with the present invention includes one or more tool members that may be changed with each other and that may be solidly secured to the tool handle or to the power tool.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool coupling device comprising:

a stem including a front portion having a channel formed therein, and having an orifice laterally formed therein and communicating with said channel of said stem, and having an enlarged head provided thereon, a first tool member and at least one second tool member each including a first end for selectively engaging into said channel of said stem, and each including an aperture formed in said first end thereof, a ball slidably received in said orifice of said stem, and selectively engageable into said aperture of either said first tool member or said at least one second tool member, for detachably securing either said first tool member or said at least one second tool member to said stem, a barrel including a bore formed therein for rotatably receiving said stem, and including a middle portion having a peripheral bulge extended radially and inwardly into said bore of said barrel for forming a front chamber and a rear chamber in said barrel, and for selectively engaging with said ball, and for selectively forcing said ball into said aperture of either said first tool member or said at least one second tool member, and thus for detachably securing either said first tool member or said at least one second tool member to said stem, said enlarged head of said stem being slidably received in said front chamber of said barrel, said barrel including a ramp provided therein and inclined from said peripheral bulge toward said front chamber of said barrel, a spring engaged onto said stem, and engaged with said barrel, for biasing said peripheral bulge of said barrel to engage with said ball, and to force said ball into said aperture of either said first tool member or said at least one second tool member, and a collar secured onto said stem, and engaged with said spring, for engaging said spring between said collar of said stem and said peripheral bulge of said barrel.

2. The tool coupling device according to claim 1, wherein said barrel includes an outer peripheral portion having an outer peripheral recess formed therein, and a ferrule engaged onto said outer peripheral recess of said barrel for moving said barrel relative to said stem.

* * * * *